US006394921B1

United States Patent
Fukuda

(10) Patent No.: US 6,394,921 B1
(45) Date of Patent: May 28, 2002

(54) CAGE PLATE ADJUSTING MECHANISM FOR A BICYCLE REAR DERAILLEUR

(75) Inventor: Masahiko Fukuda, Amagasaki (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/482,848

(22) Filed: Jan. 14, 2000

(51) Int. Cl.⁷ ............................. F16H 9/00; F16H 63/00
(52) U.S. Cl. ........................................... 474/80; 474/82
(58) Field of Search ............................. 474/80, 82, 81, 474/83, 69, 70, 78, 122; 411/372, 131, 134, 376, 107, 290, 303, 247, 302

(56) References Cited

U.S. PATENT DOCUMENTS

| | | | | |
|---|---|---|---|---|
| 4,302,136 A | * | 11/1981 | Abe et al. ................. | 411/158 |
| 4,406,643 A | * | 9/1983 | Shimano .................. | 474/82 |
| 4,530,677 A | * | 7/1985 | Nagano .................... | 474/80 |
| 4,833,937 A | | 5/1989 | Nagano ................. | 74/501.5 R |
| 4,850,940 A | | 7/1989 | Nagano .................... | 474/80 |
| 4,938,324 A | * | 7/1990 | Van Dyke .............. | 474/82 X |
| 4,954,121 A | * | 9/1990 | Juy ........................ | 474/82 |
| 5,383,716 A | * | 1/1995 | Stewart et al. ........... | 301/105 |
| 5,498,211 A | * | 3/1996 | Hsu ........................ | 474/80 |

FOREIGN PATENT DOCUMENTS

DE 4029376 * 3/1992
EP 0032049 7/1981 ............. B62M/9/12

* cited by examiner

Primary Examiner—David Fenstermacher
Assistant Examiner—Marcus Charles
(74) Attorney, Agent, or Firm—Shinjyu Global IP Counselors, LLP

(57) ABSTRACT

An adjusting mechanism is provided for a bicycle derailleur, which can adjust a position of a chain guide in an axial direction. The derailleur basically has a base member, a movable member with a chain guide and a linkage assembly. The adjustment mechanism is operatively coupled between the movable member and the chain guide. In one embodiment, the movable member has the adjusting mechanism that movably supports the movable member in an axial direction on a second axle. The adjusting mechanism basically has a first tubular guide portion extending from the movable member to pivotally engage the second axle. A second tubular guide portion extends from the chain guide and is arranged around the first tubular guide portion. A biasing member is positioned between the first and second tubular guide portion to urge the movable member relative to chain guide in a rotational direction about the second axle. In another embodiment, the base member has an adjusting mechanism that movably supports the base member in an axial direction on a first axle.

41 Claims, 7 Drawing Sheets

CAGE PLATE ADJUSTING MECHANISM FOR A BICYCLE REAR DERAILLEUR

BACKGROUND OF THE INVENTION

1. Field of the Invention

This invention generally relates to a rear derailleur for a bicycle. More specifically, the present invention relates to an adjusting mechanism for adjusting the position of the chain guide in an axial direction with respect to a multistage sprocket assembly of the bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One part of the bicycle that has been extensively redesigned is the drive train of the bicycle.

Most of today's bicycles are multi-speed bicycles that allow the rider to select the appropriate gear ratio to suit the particular riding conditions encountered during the bicycle ride. One of the most popular types of gearing assemblies for multi-speed bicycles utilize a chain extending between a set of front sprockets mounted for rotation with the pedals and a set of rear sprockets mounted on the rear hub of the rear bicycle wheel for rotation therewith. Two derailleurs are typically used to move the chain between the sprockets or gears. Generally, most derailleurs (front or rear derailleurs) include a fixed or base member secured to a bicycle frame, and a movable member with a chain guide that is supported for movement relative to the fixed or base member by a linkage assembly. The chain guide has a pair of guide plates that form a chain receiving slot for contacting and moving a chain between the sprockets.

In the case of a rear derailleur, the chain guide has a pair of pulleys that are rotatably mounted between the guide plates. Also the base member in a rear derailleur is supported swingably to the bicycle frame through a horizontal shaft or axle, and the chain guide is swingably mounted to the movable member through a horizontal shaft or axle. A spring is interposed between the movable member and the chain guide for applying tension to the chain guide. The base member is fixed to a fork end of the bicycle frame, with the chain guide being disposed radially outwardly of the multistage sprocket assembly.

When the rider operates the shift operating device of the front derailleur shifting mechanism, the operating conduit or cable pulls the front derailleur such that the chain is moved outwardly from one gear or sprocket to the next gear or sprocket, or releases the front derailleur such that the chain is moved inwardly from one gear or sprocket to the next gear or sprocket. Likewise, when the rider operates the shift operating device of the rear derailleur shifting mechanism, the operating conduit or cable pulls the rear derailleur such that it moves the chain inwardly from one gear or sprocket to the next inner gear or sprocket, or releases the rear derailleur such that it moves the chain outwardly from one gear or sprocket to the next gear or sprocket. In other words, when the shift operating devices are moved to release the derailleur, the front derailleur will move inwardly towards the center of the bicycle, while the rear derailleur will move outwardly away from the center of the bicycle.

The conventional derailleur which includes a chain guide capable of being adjusted in its axial position with respect to the multistage sprocket assembly is well-known as disclosed in U.S. Pat. No. 4,850,940 to Nagano and assigned to Shimano, Inc. Specifically, Shinano's prior U.S. Pat. No. 4,850,940 shows an adjusting mechanism for a chain guide which has a housing or movable member non-rotatably mounted on a tubular member via an adjusting screw. The tubular member is coupled to the chain guide via a fixing pin and bushing. A spring is disposed inside the tubular member to rotationally bias the tubular member and housing. The housing has an outer cylindrical portion that is slidable on the tubular member. The housing is not coupled to the fixing pin. Because the outer cylindrical portion is sized to slide on the tubular member and the housing is not coupled to the fixing pin, some play or looseness exists between these members. Also, due to this looseness, the housing can vibrate on the tubular member. Such vibrations can cause the adjusting screw to rotate undesirably. Such rotation of the adjusting screw can allow the chain guide to be out of alignment with the free wheel sprockets.

Therefore, it is desirable to have an adjustment mechanism with a housing that eliminates the play or looseness between the housing and the tubular member. Providing a housing that has an inner cylindrical portion that is slidable on the fixing pin can eliminate this looseness. It is also desirable to provide an adjusting screw that will not rotate undesirably due to vibrations.

In view of the above, there exists a need for derailleur which overcomes the above mentioned problems in the prior art. This invention addresses this need in the prior art as well as other needs, which will become apparent to those skilled in the art from this disclosure.

SUMMARY OF THE INVENTION

One object of the present invention is to provide all adjusting mechanism for a rear derailleur that has less play than adjusting mechanisms of the prior art.

Another object of the present invention is to provide an adjusting mechanism for a rear derailleur that is easy to assemble.

Another object of the present invention is to provide an adjustment mechanism for a rear derailleur that has an anti-loosening mechanism.

The foregoing objects of the present invention can basically be attained by providing an adjusting mechanism for adjusting a position of a chain guide of a bicycle derailleur in an axial direction. The adjusting mechanism basically comprises an axle, a housing, a fixed element, a biasing member and an adjustment member operatively coupled between said housing and said fixed element to movably support said housing in an axial direction on said axle. The axle has a first end and a second end. The housing has an attachment portion and a first tubular guide portion. The attachment portion is adapted to be coupled to a linkage assembly of the bicycle derailleur. The first tubular guide portion is pivotally coupled to the first end of the axle. The fixed element has a second tubular guide portion that is coupled to the second end of the axle. The second tubular guide portion extends from the fixed element and is coaxially arranged around the first tubular guide portion. The biasing member is positioned between the first and second tubular guide portions and arranged to urge the housing relative to the fixed element in a rotational direction about the axle.

The foregoing objects of the present invention can basically be attained by providing a derailleur for a bicycle with an adjusting mechanism for adjusting a position of a chain guide of a bicycle derailleur in an axial direction. The derailleur basically comprises a base member, a movable member with a chain guide and a linkage assembly. The base member is arranged to be coupled to a part of the bicycle and pivotally supported on a first axle with a fixed element. The movable member is adapted to shift a chain of the bicycle in a transverse direction. The movable member is pivotally supported on a second axle that is coupled to a plate element of the chain guide. The linkage assembly is movably coupled between the base member and the movable member to move the chain guide between a retracted position and an extended position. Either the base member or the movable member has an adjusting mechanism for movably supporting it in an axial direction on a corresponding first or second axle. The adjusting mechanism has a first tubular guide portion extending from the selected member to pivotally engage the corresponding first or second axle. A second tubular guide portion extends from the selected element and is coaxially arranged around the first tubular guide portion. A biasing member is positioned between the first and second tubular guide portions and arranged to urge the selected member relative to the selected element in a rotational direction about the corresponding axle. An adjustment member is operatively coupled between the selected member and the selected element.

In a preferred embodiment, a derailleur comprises a base member, a movable member with a chain guide and a linkage assembly. The base member is arranged to be coupled to a part of the bicycle and pivotally supported on a first axle with a fixed element. The movable member is adapted to shift a chain of the bicycle in a transverse direction. The movable member is pivotally supported on a second axle that is coupled to the chain guide. The linkage assembly is movably coupled between the base member and the movable member to move the chain guide between a retracted position and an extended position. In one embodiment, the movable member has an adjusting mechanism that movably supports said movable member in an axial direction on the second axle. The adjusting mechanism basically includes a first tubular guide portion extending from the movable member to pivotally engage the second axle, a second tubular guide portion extending from the chain guide and arranged around the first tubular guide portion, a biasing member positioned between the first and second tubular guide portions and arranged to urge the movable member relative to chain guide in a rotational direction about the second axle, and an adjustment member operatively coupled between the movable member and the chain guide. In another embodiment, the base member has an adjusting mechanism that movably supports the base member in an axial direction on the first axle.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
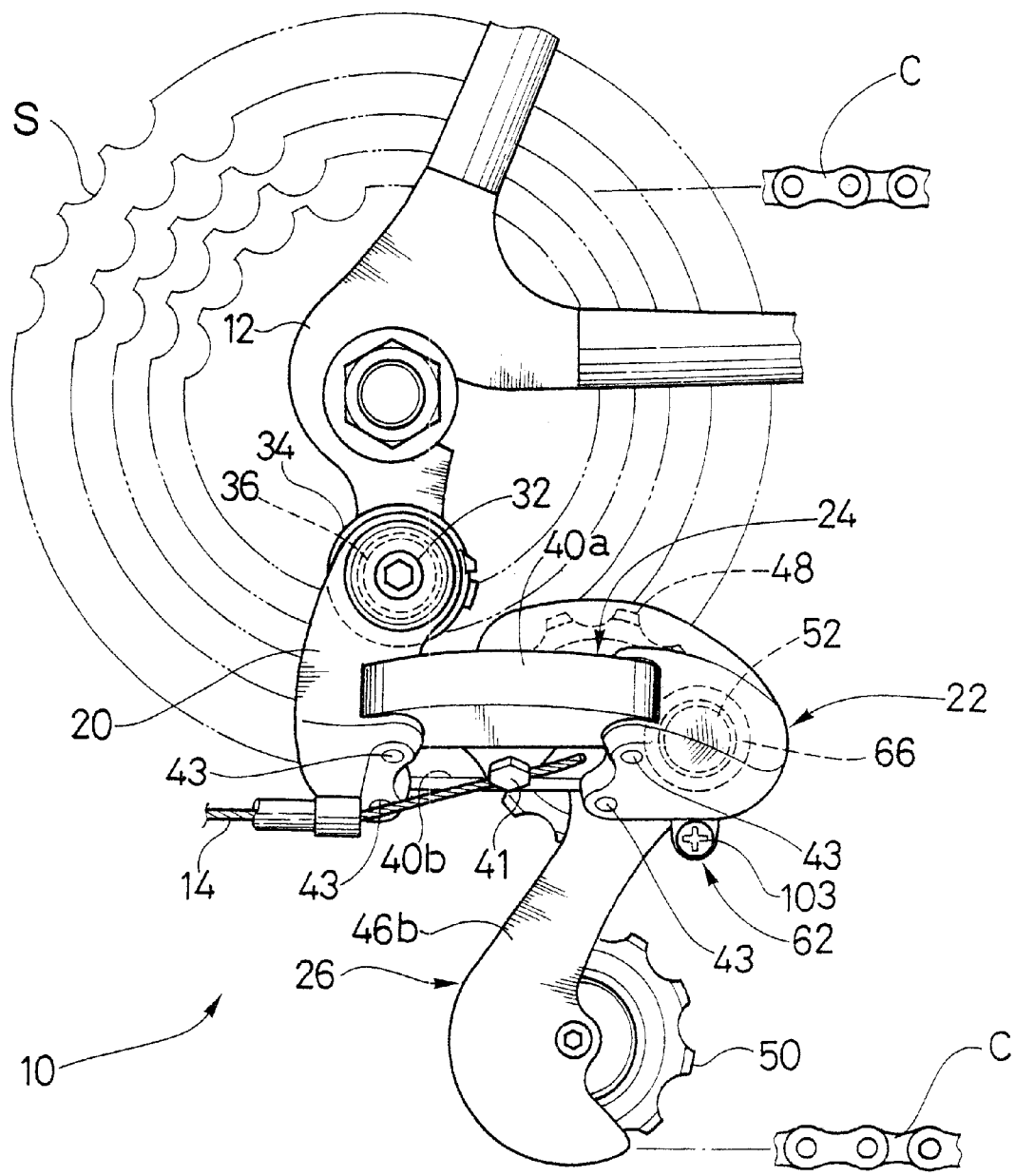
FIG. 1 is a partial side elevational view of a portion of a conventional bicycle with a rear derailleur coupled thereto in accordance with one embodiment of the present invention.
Figure 2:
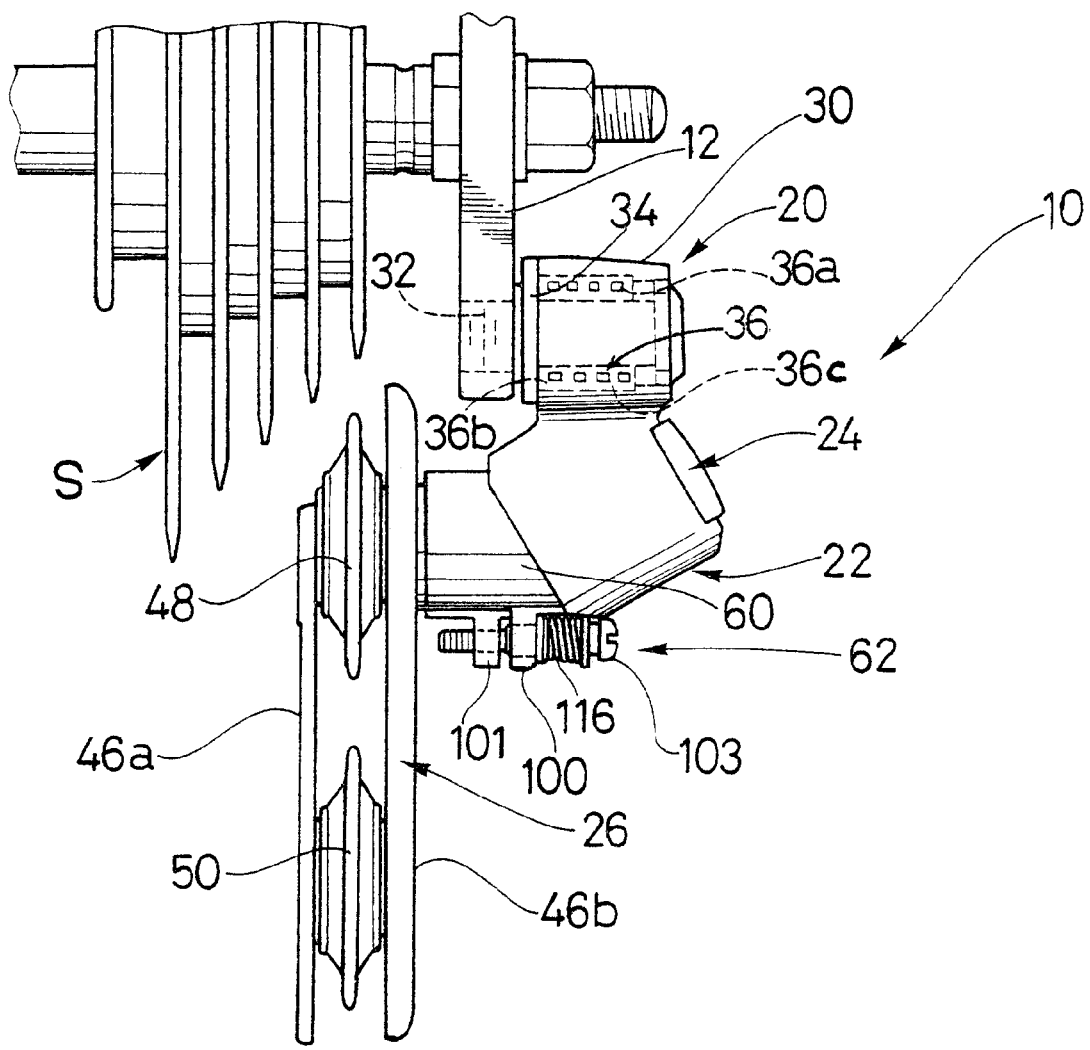
FIG. 2 is a partial rear end elevational view of the bicycle illustrated in FIG. 1 with the rear derailleur in accordance with the present invention mounted on the frame of the bicycle.
Figure 3:
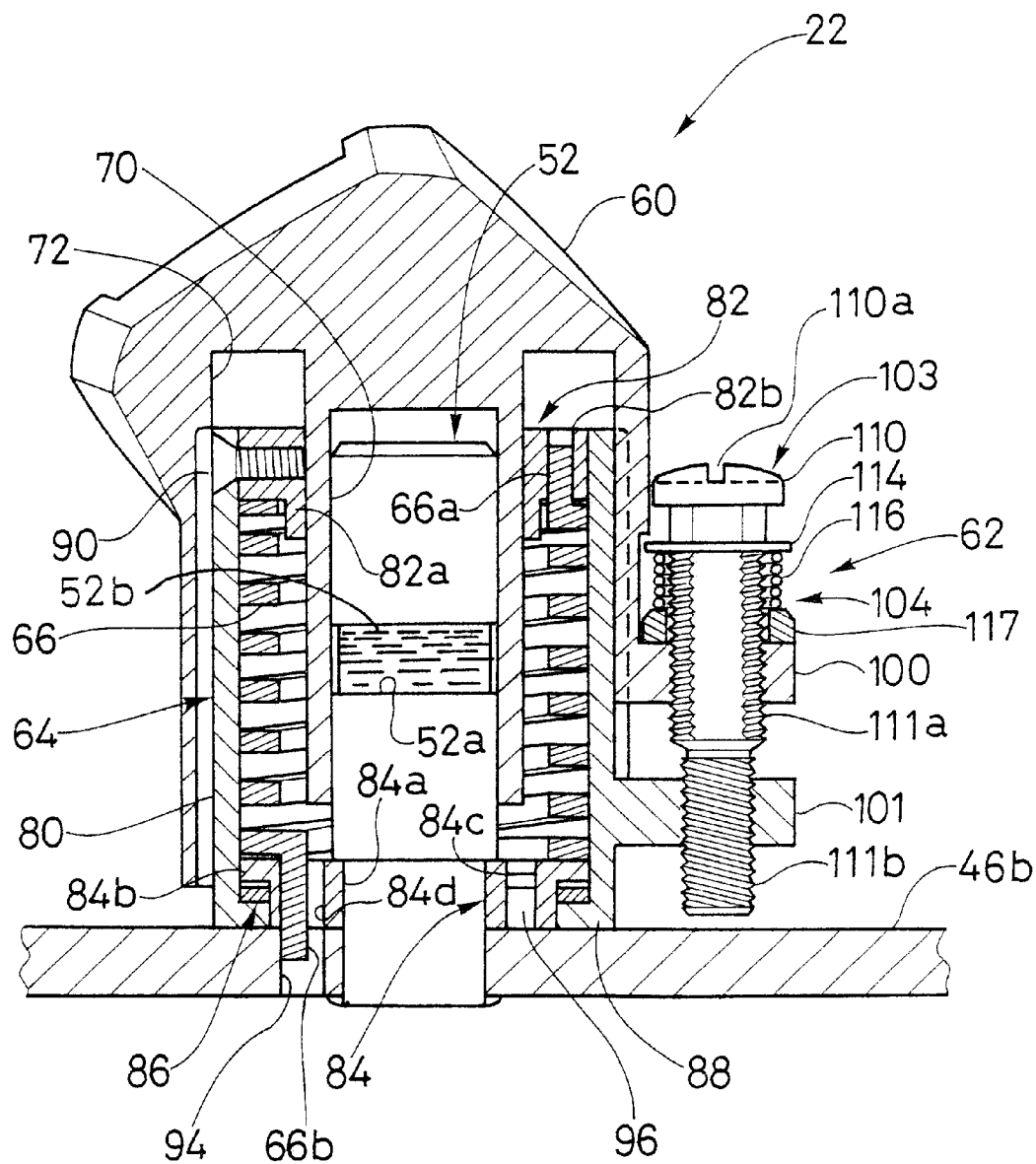
FIG. 3 is a partial cross sectional view of the movable member of the rear derailleur illustrated in FIGS. 1 and 2 in accordance with the present invention with certain portions broken away for the purposes of illustration.
Figure 4:
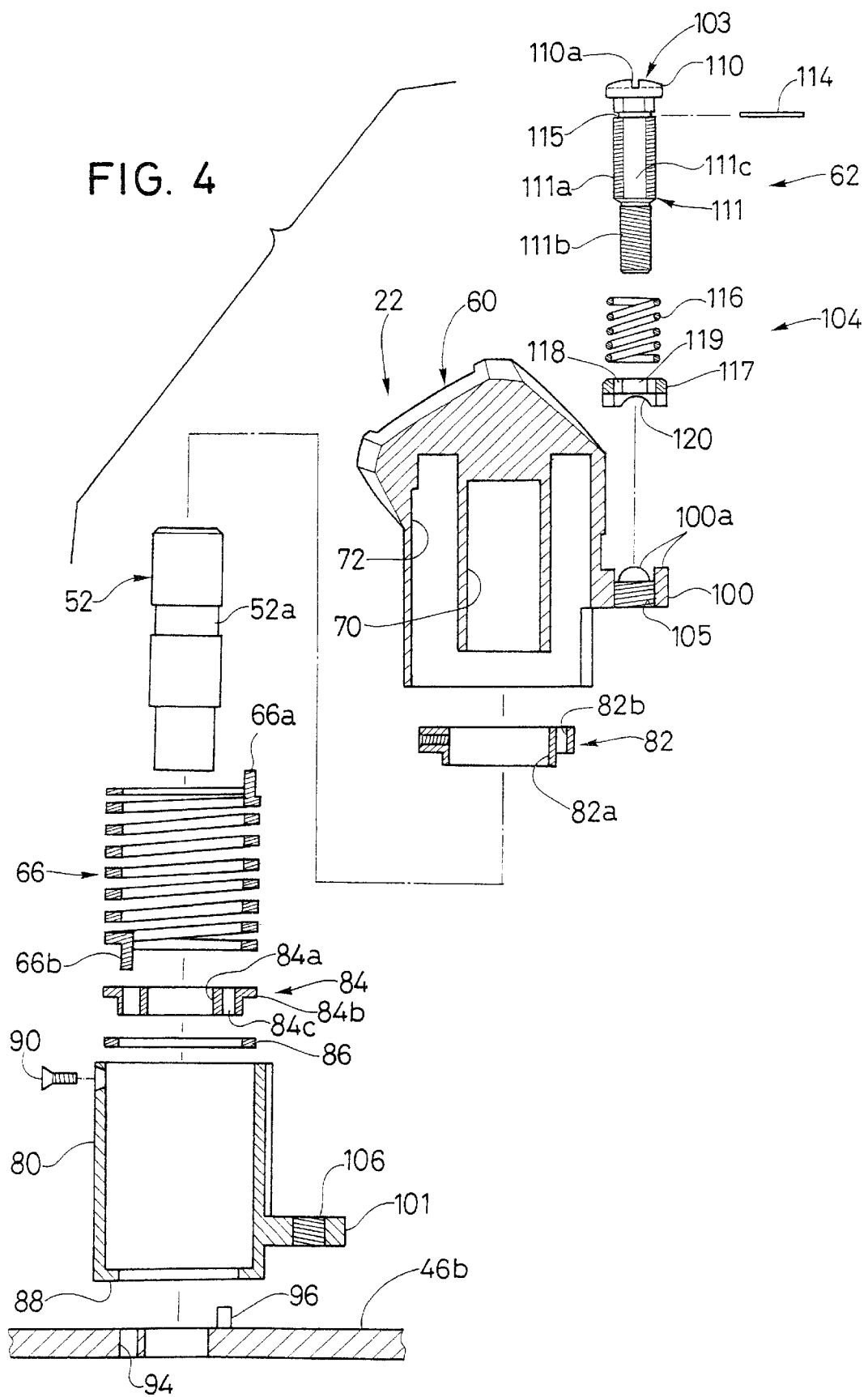
FIG. 4 is an exploded cross-sectional view of the movable member illustrated in FIG. 3 in accordance with the present invention.
Figure 5:
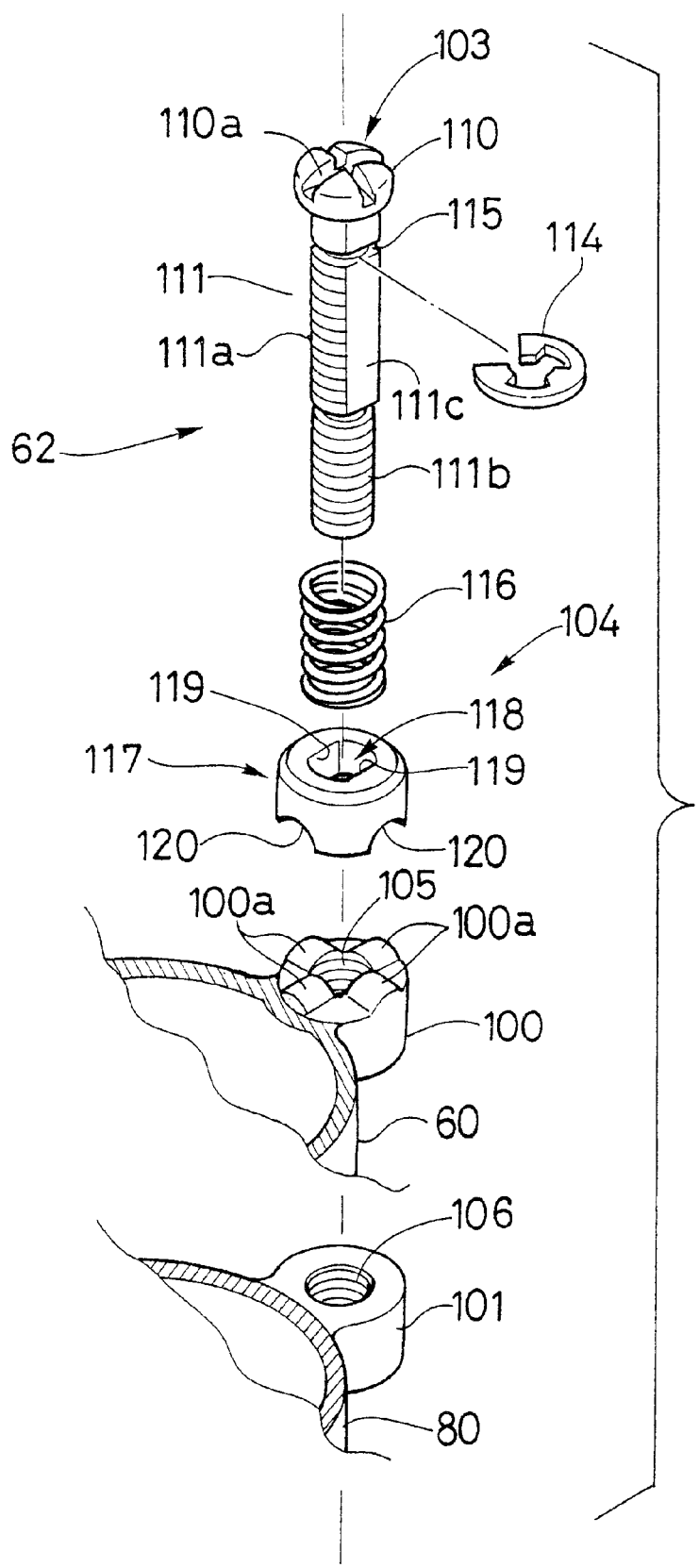
FIG. 5 is an exploded perspective view of the adjustment mechanism of the rear derailleur illustrated in FIGS. 1–4 in accordance with the present invention with certain portions broken away for the purposes of illustration.
Figure 7:
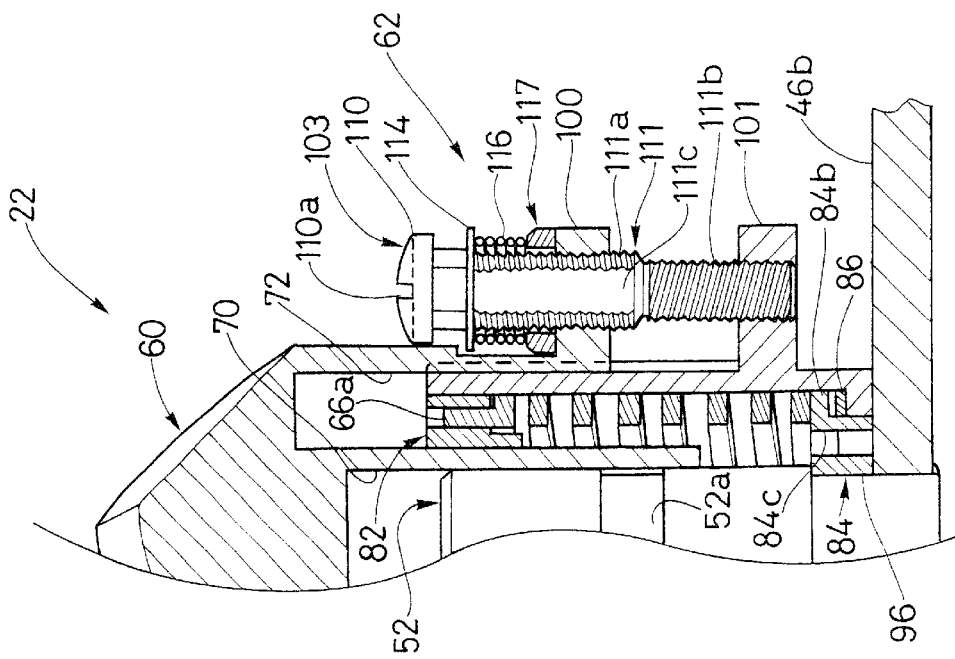
FIG. 7 is a partial cross sectional view of the movable member illustrated in FIGS. 3–5 in accordance with the present invention with certain portions broken away for the purposes of illustration showing another installation position.
Figure 6:
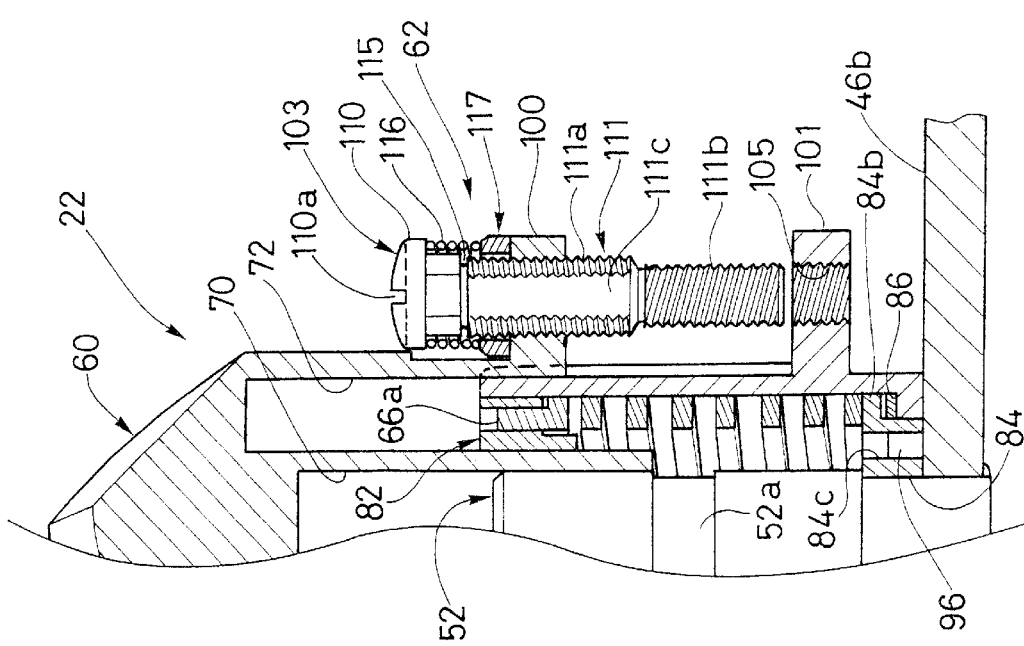
FIG. 6 is a partial cross sectional view of the movable member illustrated in FIGS. 3–5 in accordance with the present invention with certain portions broken away for the purposes of illustration showing a first installation position.

Referring initially to FIGS. 1 and 2, a rear derailleur 10 in accordance with the present invention is illustrated as being coupled to frame 12 of a bicycle (only a portion illustrated in FIG. 1). More specifically, rear derailleur 10 is illustrated as being coupled to the rear fork end of frame 12 of a bicycle which has a rear gear assembly having multiple rear gears or sprockets S with a chain C operatively coupling rear sprockets S to a set of front gears or sprockets (not shown) in a conventional manner for transmitting the desired rotational torque to the rear wheel of the bicycle.

Rear derailleur 10 is coupled to a rear derailleur shifting mechanism (not shown) via a rear derailleur cable 14 in a conventional manner. More specifically, derailleur 10 is designed to be normally biased outwardly such that the chain C is normally positioned on the outermost gear or sprocket S. In other words, when the rider moves the rear derailleur shifting mechanism, cable 14 pulls rear derailleur 10 to move chain C inwardly to engage the next gear. In other words, chain C is moved inwardly towards the center of the bicycle to engage the next larger gear or sprocket.

Rear derailleur 10 basically includes a base member 20, a movable member 22, a linkage assembly 24 and a chain guide 26. Base member 20 or movable member 22 can have an adjustment mechanism for adjusting the position of the chain guide 26 in an axial direction with respect to the rear sprockets S of the bicycle as discussed below. While a mechanical derailleur is illustrated, it will be apparent to those skilled in the art that the adjustment mechanisms can be employed in other types of derailleurs such as pneumatic derailleurs, electric derailleurs or electromechanical derailleurs.

Generally, base member 20 is fixedly coupled to frame 12 for limited rotational movement, while movable member 22 is coupled to base member 20 via linkage assembly 24. Chain guide 26 is pivotally coupled to movable member 22 as discussed below. The basic operation of rear derailleur 10 is well known in the prior art. Therefore, rear derailleur 10 will not be discussed or illustrated in detail herein. Rather, this disclosure will focus on the adjustment mechanisms of the movable member 22 and the base member 20' of the second embodiment.

While base member 20 is illustrated as being coupled directly to frame 12, it will be apparent to those skilled in the art from this disclosure that a removable derailleur hanger or hanging plate (not shown) may be utilized to connect base member 20 of rear derailleur 10 to frame 12. These types of derailleur hangers (not shown) are well-known in the art, and thus, will not be discussed or illustrated herein.

As seen in FIGS. 1 and 2, base member 20 has a housing 30 rotatably supported on a first horizontal shaft or axle 32 in a conventional manner. The base member 20 further includes a base element (stopper plate) 34 that is secured to the first axle 32 and to frame 12 in a conventional manner. A first coil spring or biasing member 36 is coaxially mounted about the axle 32. The first spring 36 has a first end 36a coupled to the housing 30, a second end 36b coupled to the stopper plate 34 and a coiled portion 36c coaxially arranged about the first axle 32. First axle 32 is a bolt that is threadedly coupled to the frame 12 of the bicycle such that the first axle 32 forms a pivot axis. The base member 20 is relatively conventional and can be further understood by U.S. Pat. No. 4,690,663. Basically, first spring 36 is preferably a conventional coil spring with the first end 36a secured within an axially oriented bore of housing 30, and the second free end 36b received in an axially oriented hole of stop plate 34. First coil spring 36 is sized to be positioned about shaft of fixing bolt or axle 32.

The housing 30 of the base member 20 is rotatably supported to the first horizontal axle 32. The housing 30 has an attachment portion for swingably supporting the linkage assembly 24 and the movable member 22 about first axle 32.

The linkage assembly 24 includes a pair of links 40a and 40b that are pivotally coupled at first ends to the housing 30 of the base member 20 and pivotally coupled at their other ends to the movable member 22. Specifically, four pins 43 are used to pivotally couple links 40a and 40b to the base member 20 and the movable member 22. A coil spring (not shown) is coupled between the links 40a and 40b for biasing the chain guide 26 to the correct gear position.

The outer link 40a is provided with a cable fixing bolt 41 for attaching the free end of the inner wire of shift cable 14 thereto. Accordingly, when the rider operates the rear derailleur shifting mechanism to pull the inner wire of shift cable 14, this will cause links 40a and 40b to pivot inwardly against the bias of the coil spring (not shown) and will cause movable member 22 and the chain guide 26 to move inwardly towards the center of the bicycle. This in turn will cause the chain C to move from an outer gear to the next inner gear. Of course, if the rear derailleur shifting mechanism is moved to release the inner wire of shift cable 14, the spring (not shown) will move the linkage members 40a and 40b such that the chain guide 26 will move the chain C outwardly from a larger gear to a smaller gear.

As seen in FIGS. 1 and 2, chain guide 26 basically has a pair of guide plates 46a and 46b with a guide sprocket or pulley 48 rotatably coupled between guide plates 46a and 46b and a tension sprocket or pulley 50 rotatably coupled between guide plates 46a and 46b. Guide sprocket 48 and tension sprocket 50 engage chain C in a conventional manner. Accordingly, the additional parts of chain guide 26 will not be discussed or illustrated in detail herein. Pulleys 48 and 50 engage with the driving chain C in an inverse-S-like manner, thereby guiding the chain C to a desired sprocket S of the multistage sprocket assembly.

The chain guide 26 is movably supported on the movable member 22 by a second horizontal shaft or axle 52. Specifically, one end of the horizontal shaft or axle 52 is fixedly coupled within a hole in the guide plate 46b. The chain guide 26 can move axially along the second axle 52 as well as pivot about the axis of the second axle 52. In the illustrated embodiment, horizontal shaft or axle 52 is riveted to guide plate 46b. Of course, it will be apparent to those skilled in the art from this disclosure that the axle 52 could be attached in other ways to guide plate 46b.

The movable member 22 is pivotally mounted on the horizontal axle 52, which is substantially parallel to the first horizontal axle 32. Preferably, the horizontal axle 52 is provided with an annular groove 52a in its center for receiving a lubricant or grease 52b so that the movable member 22 can smoothly pivot and/or slide on the axle 52. The movable member 22 has an attachment portion that is pivotally coupled to links 40a and 40b via a pair of pivot pins 43.

Movable member 22 basically includes a housing 60, an adjustment mechanism 62, a fixed element 64 and a second spring 66. The housing 60 is pivotally coupled to the linkage assembly 24, while the fixed element 64 is fixedly secured to the guide plate 46b via the second axle 52.

The adjustment mechanism 62 is coupled between the housing 60 and the fixed element 64 so that the chain guide 26 can be moved in an axial direction along the second axle 52 to change the axial position of the chain guide 26. The adjusting mechanism 62 will be discussed in further detail below.

The housing 60 further includes a cavity, which receives the fixed element 64 therein. The cavity of the housing 60 has a centrally located first tubular guide portion 70 that forms a blind bore for pivotally and slidably receiving a first end of the second axle 52 therein. An annular tubular recess 72 is formed around the first tubular guide portion 70 for slidably receiving the fixed element 64 therein.

The fixed element 64 basically includes a second tubular guide portion 80 with an annular flange 88, a first bushing 82 mounted at one end of the second tubular guide portion 80, a second bushing 84 mounted at the other end of the second tubular guide portion 80 and at least one washer 86 located between the second bushing 84 and the second tubular guide portion 80. The fixed element 64 is secured to the guide plate 46b via the second axle 52. The guide plate 46b acts as a base element in this embodiment. Specifically, the second end of the second axle 52 has a reduced diameter so that an abutment shoulder is formed for holding the fixed member 64 against the guide plate 46b.

The second tubular guide portion 80 is designed to rotate about the second axle 52. In particular, the second tubular guide portion 80 is non-rotatably coupled to the housing 60 so that they rotate together about the second horizontal axle 52. The second tubular guide portion 80 has an inwardly extending annular flange 88 that engages the second bushing 84. The flange 88 and bushing 84 with washer 86 disposed therebetween cooperate to rotatably secure the second tubular guide portion 80 around the axle 52.

The first bushing 82 is an annular ring-shaped member that is fixedly coupled to a first or free end of the second tubular guide portion 80 via a bolt 90. The first bushing 82 has a center bore 82a that slidably receives the second tubular guide portion 80 and an axially extending hole 82b for receiving first end 66a of the second spring 66. Accordingly, the first end 66a of the second spring 66 applies a rotational biasing force on the second tubular guide portion 80 and the housing 60, which is non-rotatably coupled to the second tubular guide portion 80.

The second bushing 84 is a ring-shaped member with a center bore 84a that has the second axle 52 therein, The second bushing 84 has a step-shaped outer periphery. The outer periphery of the second bushing 84 forms annular shoulder portion 84b that is sized to overlap with the annular flange 88 of the second tubular guide portion 80.

Interposed between the annular flange 88 of the second guide portion 80 and the annular shoulder portion 84b of the second bushing 84 is a washer 86 that reduces the friction therebetween. Accordingly, the second tubular guide portion 80 is rotatably secured around the second bushing 84. The second bushing 84 is non-rotatably secured to the guide plate 46b via a pin 96 that extends from the guide plate 46b into an axially extending opening 84c of the second bushing 84. The second bushing 84 also has a second axially extending opening 84d for receiving the second end 66b of the second spring 66. The second axial opening 84d is aligned with a bore 94 in the guide plate 46b such that the second end 66b of the second spring 66 also directly engages the guide plate 46b. Accordingly, the chain guide 26 is biased about the axis of the second axle 52 via the second spring 66.

The adjusting mechanism 62 of the movable member 22 basically includes a first tab member 100 coupled to the housing 60, a second tab member 101 coupled to the second tubular guide portion 80 and an adjusting member or screw 103 with an anti-loosening mechanism 104. The first and second tab members 100 and 101 extend outwardly from the walls of the housing 60 and the second tubular guide portion 80, respectively. The first and second tab members 100 and 101 have threaded bores 105 and 106, respectively, for threadedly receiving the adjusting screw 103. The adjusting screw 103 is inserted into tab members 100 and 101. The adjusting screw 103 adjusts the axial position of the second tubular guide portion 80 with respect to the housing 60, thereby constituting an adjusting means.

The adjusting screw 103 has a head portion 110 and a shaft portion 111. The head portion 110 has a tool receiving recess 100a for receiving a tool to rotate the screw 103. The shaft portion 111 has a first set of right hand threads 111a and a second set of left hand threads 111b. Accordingly, the threaded bores 105 and 106 of tab members 100 and 101 have different spiral directions relative to each other. Thus, the first set of threads 111a of the adjusting screw 103 and threaded bore 105 are spiraled in a different direction from the second set of threads 111b of the adjusting screw 103 and threaded bore 106. In other words, the threaded bores 105 and 106 have corresponding right hand threads and left hand threads, respectively. Rotation of the adjusting screw 103 causes axial movement of the second tubular guide portion 80 away from or toward the housing 60.

The anti-loosening mechanism 104 is installed around shaft portion 111 of adjusting screw 103. The anti-loosening mechanism 104 basically includes a snap-ring 114 that is received in an annular groove 115 on the shaft portion 111 of the adjusting screw 103, a coil spring 116 and a retaining washer 117 that is non-rotatably secured to the shaft portion 111 of the adjusting screw 103. The spring 116 is designed to hold the retaining washer 117 against tab member 100 and also places the threads 111a and 111b of the screw 103 in axial compression with the threads of the bores 105 and 106.

The retaining washer 117 has a non-circular hole 118 with a pair of oppositely spaced apart flat surfaces 119 that engage a pair of flat surfaces 111c of the shaft portion of the adjusting screw 103. Accordingly, the retaining washer 117 is non-rotatably coupled to the adjusting screw 103, but axially slidable on the shaft portion 111 of the adjusting screw 103. The retaining washer 117 also preferably includes four recesses 120 that engage four protrusions 100a formed on the first tab member 100. These recesses 120 and protrusions 100a cooperate to prevent rotational movement of the adjusting screw 103. Thus, the adjusting screw 103 is prevented from being accidentally disengaged from bore 106 of tab member 101, Assembly of the adjustment mechanism 62 is easily attained by the arrangement of the present invention. First, the fixed element 64 is assembled. The washer 86 and the second bushing 84 are first inserted into the second tubular guide portion 80 so that the second bushing 84 and the washer 86 rests on the annular flange 88 of the second tubular guide portion 80. Next, the spring 66 is inserted into the second tubular guide portion 80 so that the second end 66b of the spring 66 engages the bore 84d in the second bushing 84. The first bushing 82 can now be inserted into the end of the second tubular guide portion 80 so that the first end 66a of the spring 66 is engaged in hole 82b of the first bushing 82. The first bushing 82 can now be secured to the second tubular guide portion 80 via screw 90.

The fixed element 64 can now be fastened to the chain guide plate 46b by first axle 52 which is riveted to the chain guide plate 46b. It is important when installing the fixed element 64 to the guide plate 46b that the second bushing 84 is fastened to pin 96 and the second end 66b of the spring 66 is inserted into the bore 94 of the guide plate 46b.

Next, the adjusting screw 103 is initially threaded into the first tab member 100 of the housing 60 with the spring 116 and the retaining washer 117 thereon. The housing 60 is now installed on the fixed element 64 and the second axle 52 so that the first tubular guide portion 70 closely engages the second axle 52. In particular, the first tubular guide portion 70 is aligned with the second axle 52 and inserted thereon. Moreover, the first bushing 82 engages the outer surface of the first tubular guide portion 70. Accordingly, the second tubular guide portion 80 is now coaxially mounted around the first tubular guide portion 70 with the first bushing 82 providing for smooth sliding therebetween. This arrangement provides for very little undesirable play between axle 52 and housing 60.

Next, the free end of the adjusting screw 103 contacts the threaded bore 106 of the second tab member 101. Accordingly, the adjusting screw 103 is now rotated such that the first set of threads 111a move the adjusting screw 103 in an axial direction out of the first tab member 100, while the second set of threads 111b simultaneously are threaded into the second threaded bore 106 of the second tab member 101. Once the screw 103 is sufficiently engaged in the second threaded bore 106 of the second tab member 101, the spring 116 can now be compressed and the snap-ring 114 inserted into the groove 115 of the adjusting screw 103. This now applies an axial force on the retaining washer 117, which prevents accidental rotation of the adjusting screw 103. Now the screw 103 can be further loosened for shipment.

Second Embodiment

Figure 8:
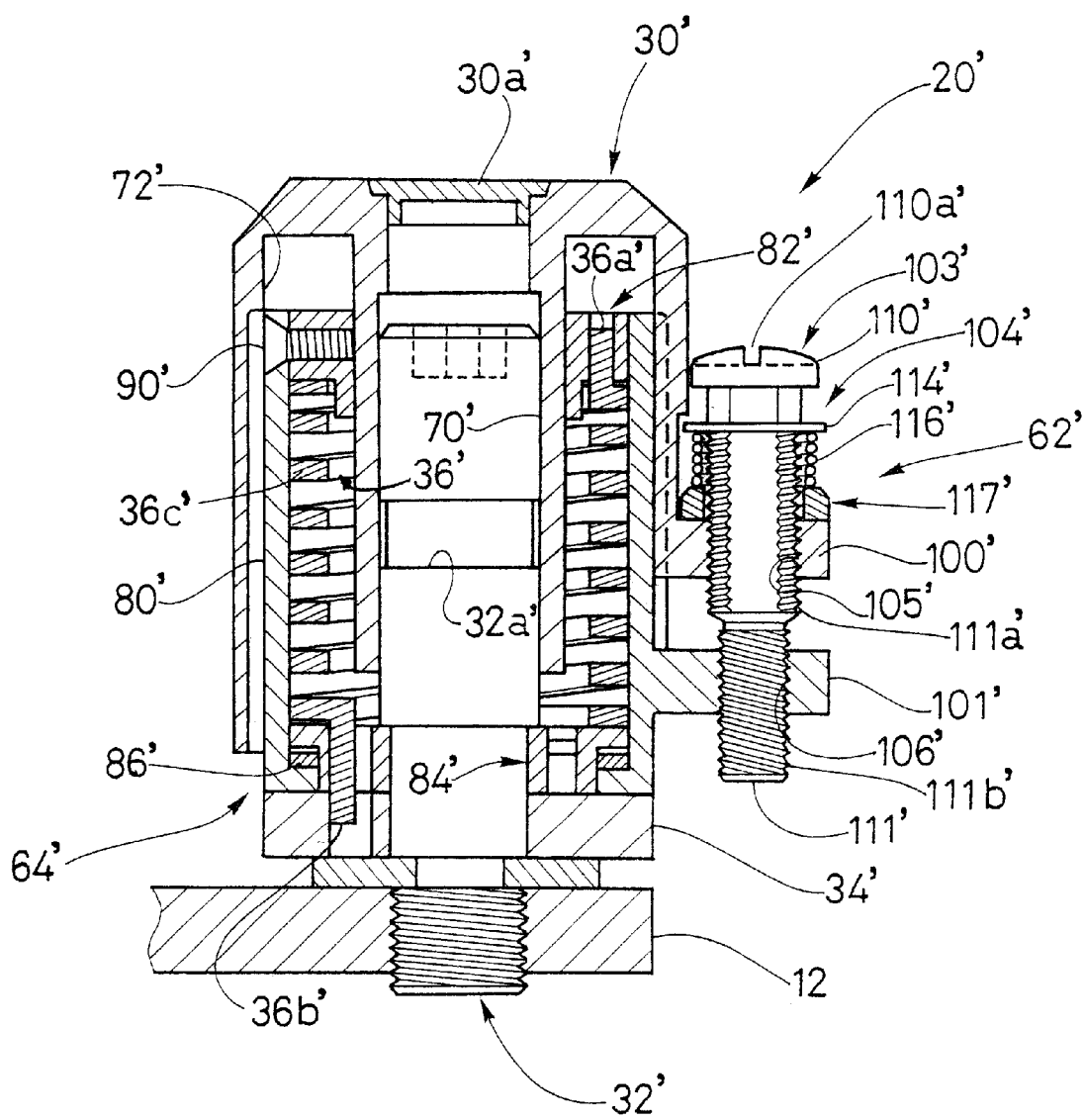
FIG. 8 is a partial cross sectional view of a modified base in accordance with another embodiment of the present invention with certain portions broken away for the purposes of illustration.

Referring now to FIG. 8, a portion of a derailleur 10' is illustrated in accordance with a second embodiment of the present invention. Only the base member 20' of the derailleur 10' will be illustrated, since the remainder of the derailleur 10' is conventional and can be understood by reference to the first embodiment.

The base member 20' of the derailleur 10' is provided with an adjustment mechanism 62' similar to the first embodiment, but installed on the base member 20' instead of the movable member 22. Since the construction of the adjustment mechanism 62' of the base member 20' is substantially the same as the adjustment mechanism 62 of the movable member 22 of the first embodiment, this embodiment will not be discussed or illustrated in detail herein. Moreover, in view of these similarities between the two embodiments, identical or substantially identical parts of this embodiment will be identified with the same reference numerals as the first embodiment but with a prime mark (').

In this second embodiment, the first horizontal shaft or axle 32' is fixedly coupled to the bicycle frame 12. More specifically, one end of first axle 32' is thread into a bore of the bicycle frame 12. As seen in FIG. 8, base member 20' has a housing 30' rotatably supported on a first horizontal shaft or axle 32'. The base member 20' further includes a base element (stopper plate) 34' that is secured to the axle 32' and to frame 12'. A first coil spring or biasing member 36' is coaxially mounted about the axle 32'. The first spring 36' has a first end 36a' operatively coupled to the housing 30', a second end 36b' coupled to the fixed plate 34' and a coiled portion 36c' coaxially arranged about the axis of the axle 32'.

Axle 32' is a bolt that is threadedly coupled to the frame 12 of the bicycle such that the axle 32' forms a pivot axis. The housing 30' of the base member 20' has a cap 30a' for rotating the first horizontal axle 32' to attach it to the frame 12. The housing 30' has an attachment portion for swingably supporting the linkage assembly and the movable member about first axle 32'.

Preferably, the horizontal axle 32' is provided with an annular groove 32a' in its center for receiving a lubricant or grease so that the base member 20' can smoothly pivot and/or slide on the axle 32'. The base member 20' has an attachment portion that is pivotally coupled to links of the linkage assembly.

Base member 20' basically includes a housing 30', an adjustment mechanism 62', a fixed element 64' and a second spring 36'. The housing 30' is pivotally coupled to the linkage assembly, while the fixed element 64' is fixedly secured to the frame 12 via the axle 32'.

The adjustment mechanism 62' is coupled between the housing 30' and the fixed element 64' so that the chain guide can be moved in an axial direction along the second axle 32' to change the axial position of the chain guide.

The housing 30' has a cavity, which receives the fixed element 64' therein. The cavity of the housing 30' has a centrally located first tubular guide portion 70' that forms a blind bore for pivotally and slidably receiving a first end of the second axle 32' therein. An annular tubular recess 72' is formed around the first tubular guide portion 70' for slidably receiving the fixed element 64' therein.

The fixed element 64' basically includes the stopper plate 34', a second tubular guide portion 80', a first bushing 82' mounted at one end of the second tubular guide portion 80', a second bushing 84' mounted at the other end of the second tubular guide portion 80' and at least one washer 86' located between the second bushing 84' and the second tubular guide portion 80'.

The adjusting mechanism 62' of the base member 20' basically includes a first tab member 100' coupled to the housing 30', a second tab member 101' and an adjusting member or screw 103' with an anti-loosening mechanism 104'. The first and second tab members 100' and 101' are provided at one-side walls of the housing 30' and the second tubular guide portion 80', respectively. The first and second tab members 100' and 101' having threaded bores 105' and 106' for threadedly receiving the adjusting screw 103'. The adjusting screw 103' is inserted into tab members 100' and 101'. The adjusting screw 103' adjusts the axial position of the second tubular guide portion 80' with respect to the housing 30'.

The adjusting screw 103' has a head portion 110' and a shaft portion 111'. The head portion 110' has a tool receiving recess 110a' for receiving a tool to rotate the screw 103'. The shaft portion 111' has a first set of right hand threads 111a' and a second set of left hand threads 111b'. Accordingly, the threaded bores 105' and 106' of tab members 100' and 101' have different spiral directions relative to each other. Thus, the first set of threads 111a' of the adjusting screw 103' and threaded bore 105' are spiraled in a different direction from the second set of threads 111b' of the adjusting screw 103' and threaded bore 106'. In other words, the threaded bores 105' and 106' have corresponding right hand threads and left hand threads, respectively. Rotation of the adjusting screw 103' causes axial movement of the second tubular guide portion 80' away from or toward the housing 30'. Since the construction of the adjusting mechanism 62' of the base member 20' is substantially the same as adjusting mechanism 62 of the movable member 22 of the first embodiment, the adjusting mechanism 62' of this embodiment will not be discussed or illustrated in detail herein.

The anti-loosening mechanism 104' is installed around shaft portion 111' of adjusting screw 103'. The anti-loosening mechanism 104' basically includes a snap-ring 114' that is received in an annular groove on the shaft portion 111' of the adjusting screw 103', a coil spring 116' and a retaining washer 117' that is non-rotatably secured to the shaft portion 111' of the adjusting screw 103'. Since the construction of the anti-loosening mechanism 104' of the base member 20' is substantially the same as the anti-loosening mechanism 104 of the movable member 22 of the first embodiment, the anti-loosening mechanism 104' of this embodiment will not be discussed or illustrated in detail herein.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An adjusting mechanism for adjusting a position of a chain guide of a bicycle derailleur in an axial direction, said adjusting mechanism comprising:

an axle having a first end and a second end with a longitudinal axis extending between said first and second ends;

a housing having an attachment point adapted to be coupled to a linkage assembly of the bicycle derailleur and a first tubular guide portion pivotally coupled to said first end of said axle, said first tubular guide portion being fixed to move axially with said attachment point along said axle;

a second tubular guide portion coupled to said second end of said axle, said second tubular guide portion having a larger radial width than said first tubular guide portion relative to said longitudinal axis of said axle, said second tubular guide portion being arranged radially outwardly of said first tubular guide portion relative to said axle;

a biasing member positioned between said first and second tubular guide portions and arranged to urge said housing in a rotational direction about said axle, and an adjustment member operatively coupled between said housing and said second tubular guide portion to movably support said housing in an axial direction on said axle.

2. An adjusting mechanism according to claim 1, wherein said housing has a first tab member with a first bore, said second tubular guide portion has a second tab member opposite to said first tab member and having a second bore, said adjustment member includes a screw operatively coupled within said first and second bores.

3. An adjusting mechanism according to claim 2, wherein said first bore is threaded in a first thread direction and said second bore is threaded in a second thread direction that is opposite said first thread direction, and said screw has a first set of threads corresponding to said first thread direction of said first bore and a second set of threads corresponding to said second thread direction of said second bore.

4. An adjusting mechanism according to claim 3, wherein said adjustment member further includes an anti-loosening mechanism.

5. An adjusting mechanism according to claim 3, wherein said adjustment member further includes a spring located about said screw to apply an axial force on said first and second sets of threads.

6. An adjusting mechanism according to claim 1, wherein said adjustment member includes an anti-loosening mechanism.

7. An adjusting mechanism according to claim 1, wherein said second tubular guide portion has a first bushing coupled thereto with said first bushing being arranged between said first and second tubular guide portions.

8. An adjusting mechanism according to claim 7, further comprising
a second bushing located between said axle and said second tubular guide portion.

9. An adjusting mechanism according to claim 1, wherein said biasing member is a spring having a first end operatively coupled to said housing, a second end operatively coupled to a base element and a coiled portion positioned radially between said first and second tubular guide portions.

10. An adjusting mechanism according to claim 9, wherein
said second tubular guide portion has a first bushing coupled thereto with said first bushing being arranged between said first and second tubular guide portions.

11. An adjusting mechanism according to claim 10, wherein
said first end of said spring is fixed to said first bushing which is nonrotatably coupled to said housing.

12. An adjusting mechanism according to claim 11, further comprising
a second bushing located between said axle and said second tubular guide portion.

13. A derailleur for a bicycle, comprising:
a base member arranged to be coupled to a part of the bicycle and pivotally supported on a first axle with a base element;

a movable member adapted to shift a chain of the bicycle in a transverse direction, said movable member pivotally supported on a second axle coupled to a plate element of a chain guide; and a linkage assembly movably coupled between said base member and said movable member to move said chain guide between a retracted position and an extended position, one of said members having an adjusting mechanism that movably supports said one of said members in an axial direction on a corresponding one of said axles, said adjusting mechanism including
a first tubular guide portion extending from said one of said members to pivotally engage said corresponding one of said axles, said first tubular guide portion being fixed to move axially with said one of said members, a second tubular guide portion extending from one of said elements, said second tubular guide portion having a larger radial width than said first tubular guide portion relative to a longitudinal axis of said corresponding one of said axles, said second tubular guide portion being arranged radially outwardly of said first tubular guide portion, a biasing member positioned between said first and second tubular guide portion and arranged to urge said one of said members relative to said one of said elements in a rotational direction about said corresponding one of said axles, and an adjustment member operatively coupled between said one of said members and said one of said elements.

14. A derailleur for a bicycle according to claim 13, wherein
said one of said members has a first tab member with a first bore, said second tubular guide portion has a second tab member opposite to said first tab member and having a second bore, said adjustment member includes a screw operatively coupled within said first and second bores.

15. A derailleur for a bicycle according to claim 14, wherein
said first bore is threaded in a first thread direction and said second bore is threaded in a second thread direction that is opposite said first thread direction, and
said screw has a first set of threads corresponding to said first thread direction of said first bore and a second set of threads corresponding to said second thread direction of said second bore.

16. A derailleur for a bicycle according to claim 15, wherein
said adjustment member further includes an anti-loosening mechanism.

17. A derailleur for a bicycle according to claim 16, wherein
said adjustment member further includes a spring located about said screw to apply an axial force on said first and second sets of threads.

18. A derailleur for a bicycle according to claim 13, wherein
said adjustment member includes an anti-loosening mechanism.

19. A derailleur for a bicycle, comprising:
a base member arranged to be coupled to a part of the bicycle and pivotally supported on a first axle with a base element;

a movable member adapted to shift a chain of the bicycle in a transverse direction, said movable member pivotally supported on a second axle coupled to a plate element of a chain guide; and a linkage assembly movably coupled between said base member and said movable member to move said chain guide between a retracted position and an extended position, one of said members having an adjusting mechanism that movably supports said one of said members in an axial direction on a corresponding one of said axles, said adjusting mechanism including a first tubular guide portion extending from said one of said members to pivotally engage said corresponding one of said axles, a second tubular guide portion extending from one of said elements and arranged around said first tubular guide portion, a biasing member positioned between said first and second tubular guide portion and arranged to urge said one of said members relative to said one of said elements in a rotational direction about said corresponding one of said axles, and an adjustment member operatively coupled between said one of said members and said one of said elements said corresponding one of said axles including a groove with a lubricant located therein.

20. A derailleur for a bicycle according to claim 13, wherein said second tubular guide portion has a first bushing coupled thereto with said first bushing being arranged between said first and second tubular guide portions.

21. A derailleur for a bicycle according to claim 20, further comprising a second bushing located between said corresponding one of said axles and said one of said elements.

22. A derailleur for a bicycle according to claim 13, wherein said biasing member is a spring having a first end operatively coupled to said one of said members, a second end operatively coupled to said one of said elements and a coiled portion positioned radially between said first and second tubular guide portions.

23. A derailleur for a bicycle according to claim 22, wherein said second tubular guide portion has a first bushing coupled thereto with said first bushing being arranged between said first and second tubular guide portions.

24. A derailleur for a bicycle according to claim 23, wherein said first end of said spring is fixed to said first bushing which is nonrotatably coupled to said one of said members.

25. A derailleur for a bicycle according to claim 24, further comprising a second bushing located between said corresponding one of said axles and said one of said elements.

26. A derailleur for a bicycle according to claim 13, wherein said linkage assembly comprises a pair of linkage members.

27. A derailleur for a bicycle, comprising:

a base member arranged to be coupled to a part of the bicycle and pivotally supported on a first axle;

a movable member adapted to shift a chain of the bicycle in a transverse direction, said movable member pivotally supported on a second axle coupled to a chain guide, said second axle having a center longitudinal axis; and a linkage assembly movably coupled between said base member and said movable member to move said chain guide between a retracted position and an extended position, said movable member having an adjusting mechanism that movably supports said movable member in an axial direction on said second axle, said adjusting mechanism including a first tubular guide portion extending from said movable member to pivotally engage said second axle, said first tubular guide portion being fixed to move axially with said movable member, a second tubular guide portion extending from said chain guide, said second tubular guide portion having a larger radial width than said first tubular guide portion relative to said longitudinal axis of said second axle, said second tubular guide portion being arranged radially outwardly of said first tubular guide portion relative to said longitudinal axis of said second axle, a biasing member positioned between said first and second tubular guide portions and arranged to urge said movable member relative to chain guide in a rotational direction about said second axle, and an adjustment member operatively coupled between said movable member and said chain guide.

28. A derailleur for a bicycle according to claim 27, wherein said movable member has a first tab member with a first bore, said second tubular guide portion has a second tab member opposite to said first tab member and having a second bore, said adjustment member includes a screw operatively coupled within said first and second bores.

29. A derailleur for a bicycle according to claim 28, wherein said first bore is threaded in a first thread direction and said second bore is threaded in a second thread direction that is opposite said first thread direction, and said screw has a first set of threads corresponding to said first thread direction of said first bore and a second set of threads corresponding to said second thread direction of said second bore.

30. A derailleur for a bicycle according to claim 29, wherein said adjustment member further includes an anti-loosening mechanism.

31. A derailleur for a bicycle according to claim 29, wherein said adjustment member further includes a spring located about said screw to apply an axial force on said first and second sets of threads.

32. A derailleur for a bicycle according to claim 27, wherein said adjustment member includes an anti-loosening mechanism.

33. A derailleur for a bicycle according to claim 27, wherein said second tubular guide portion has a first bushing coupled thereto with said first bushing being arranged between said first and second tubular guide portions.

34. A derailleur for a bicycle according to claim 33, further comprising a second bushing located between said second axle and said chain guide.

35. A derailleur for a bicycle according to claim 27, wherein
said biasing member is a spring having a first end operatively coupled to said movable member, a second end operatively coupled to said chain guide and a coiled portion positioned radially between said first and second tubular guide portions.

36. A derailleur for a bicycle according to claim 35, wherein
said second tubular guide portion has a first bushing coupled thereto with said first bushing being arranged between said first and second tubular guide portions.

37. A derailleur for a bicycle according to claim 36, wherein
said first end of said spring is fixed to said first bushing which is nonrotatably coupled to said movable member.

38. A derailleur for a bicycle according to claim 37, further comprising
a second bushing located between said second axle and said chain guide.

39. A derailleur for a bicycle according to claim 27, wherein
said linkage assembly comprises a pair of linkage members.

40. An adjusting mechanism for adjusting a position of a chain guide of a bicycle derailleur in an axial direction, said adjusting mechanism comprising:
an axle having a first end and a second end;
a housing having an attachment point adapted to be coupled to a linkage assembly of the bicycle derailleur and a first tubular guide portion pivotally coupled to said first end of said axle;
a second tubular guide portion coupled to said second end of said axle, said second tubular guide portion arranged around said first tubular guide portion;
a biasing member positioned between said first and second tubular guide portions and arranged to urge said housing in a rotational direction about said axle, and
an adjustment member operatively coupled between said housing and said second tubular guide portion to movably support said housing in an axial direction on said axle,
said axle including a groove with a lubricant located therein.

41. A derailleur for a bicycle, comprising:
a base member arranged to be coupled to a part of the bicycle and pivotally supported on a first axle;
a movable member adapted to shift a chain of the bicycle in a transverse direction, said movable member pivotally supported on a second axle coupled to a chain guide; and
a linkage assembly movably coupled between said base member and said movable member to move said chain guide between a retracted position and an extended position,
said movable member having an adjusting mechanism that movably supports said movable member in an axial direction on said second axle, said adjusting mechanism including
a first tubular guide portion extending from said movable member to pivotally engage said second axle,
a second tubular guide portion extending from said chain guide and arranged around said first tubular guide portion,
a biasing member positioned between said first and second tubular guide portions and arranged to urge said movable member relative to chain guide in a rotational direction about said second axle, and
an adjustment member operatively coupled between said movable member and said chain guide,
said second axle including a groove with a lubricant located therein.

\* \* \* \* \*